US012560281B2

(12) United States Patent
Foix

(10) Patent No.: US 12,560,281 B2
(45) Date of Patent: Feb. 24, 2026

(54) RESERVOIR TANK COMPRISING A SHELL AND AT LEAST ONE END WALL THAT ARE JOINED TOGETHER SO AS TO LIMIT THE DEFORMATIONS OF SAID END WALL

(71) Applicant: Airbus Operations SAS, Toulouse (FR)

(72) Inventor: Vincent Foix, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/740,034

(22) Filed: Jun. 11, 2024

(65) Prior Publication Data

US 2024/0418315 A1     Dec. 19, 2024

(30)     Foreign Application Priority Data

Jun. 13, 2023    (FR) ....................................... 2305959

(51) Int. Cl.
*F17C 1/00*          (2006.01)
*B64D 37/06*        (2006.01)
(52) U.S. Cl.
CPC ................ *F17C 1/00* (2013.01); *B64D 37/06* (2013.01); *F17C 2201/0109* (2013.01); *F17C 2221/012* (2013.01); *F17C 2223/0161* (2013.01); *F17C 2270/0189* (2013.01)
(58) Field of Classification Search
CPC ..................... F17C 2209/234; F17C 2203/012
See application file for complete search history.

(56)                References Cited

U.S. PATENT DOCUMENTS

| 1,577,974 | A | * | 3/1926 | Kelley | ..................... | B65D 7/38 |
| | | | | | | 220/612 |
| 3,029,981 | A | * | 4/1962 | Webster | .................... | F17C 1/00 |
| | | | | | | 116/DIG. 44 |
| 2009/0134147 | A1 | | 5/2009 | Gafri et al. | | |
| 2010/0155406 | A1 | * | 6/2010 | Ho | .......................... | F17C 13/04 |
| | | | | | | 220/583 |
| 2012/0006820 | A1 | * | 1/2012 | Lind | ...................... | B23K 20/06 |
| | | | | | | 53/467 |
| 2023/0036707 | A1 | * | 2/2023 | Guilloteau | ................ | F17C 1/14 |

FOREIGN PATENT DOCUMENTS

| EP | 0575395 | B1 | 8/1995 |
| WO | 9216787 | A1 | 10/1992 |

OTHER PUBLICATIONS

French Search Report for corresponding French Patent Application No. 2305959 dated Dec. 1, 2023.

* cited by examiner

*Primary Examiner* — Don M Anderson
(74) *Attorney, Agent, or Firm* — Greer, Burns & Crain, Ltd.

(57)               ABSTRACT

A tank comprising a shell having an edge face connecting first and second inner lateral surfaces of first and second portions, at least one end wall, positioned at the first portion of the shell, which has a central part in the shape of a dome, a peripheral sleeve positioned around the central part and a junction zone connecting the central part and the peripheral sleeve and having an edge face, a weld connecting the first portion and the peripheral sleeve, the edge faces of the end wall and of the shell having shapes configured to immobilize the junction zone with respect to the shell in a radial direction. Also a cryogenic reservoir with such a tank.

8 Claims, 2 Drawing Sheets

RESERVOIR TANK COMPRISING A SHELL AND AT LEAST ONE END WALL THAT ARE JOINED TOGETHER SO AS TO LIMIT THE DEFORMATIONS OF SAID END WALL

CROSS-REFERENCES TO RELATED APPLICATIONS

This application claims the benefit of French Patent Application Number 2305959 filed on Jun. 13, 2023, the entire disclosure of which is incorporated herein by way of reference.

FIELD OF THE INVENTION

The present application relates to a reservoir tank comprising a shell and at least one end wall that are joined together so as to limit the deformations of said end wall during operation, and to a cryogenic reservoir having at least one such tank.

BACKGROUND OF THE INVENTION

According to an embodiment visible in FIG. 1, an aircraft 10 comprises a plurality of cryogenic reservoirs 12 configured to store hydrogen in the cryogenic state, a plurality of hydrogen-powered motors 14 and a supply system 16 configured to convey the hydrogen from the reservoirs 12 to the motors 14. Each cryogenic reservoir 12 comprises an internal tank, an external tank in which the internal tank is positioned, and two connecting systems, which are diametrically opposite one another, connecting the internal and external tanks.

According to an embodiment visible in FIGS. 2 and 3, each tank 18 comprises a shell 20 that extends between first and second ends 20.1, 20.2 and first and second end walls 22, 24 positioned respectively at the first and second ends 20.1, 20.2 of the shell 20 so as to close it. The shell 20 is cylindrical and has an axis of revolution A20. For the remainder of the description, a longitudinal direction is parallel to the axis of revolution A20. A longitudinal plane is a plane containing the axis of revolution A20. A transverse plane is perpendicular to the axis of revolution A20. A radial direction is perpendicular to the axis of revolution A20.

Each of the first and second ends 20.1, 20.2 of the shell 20 is circular and positioned in a transverse plane. Each end wall 22, 24 has a dome shape and comprises a free edge 22.1, 24.1 positioned in a plane and connected to the shell 20 by at least one weld line 26 that extends over the entire circumference of the shell 20.

According to a first configuration, visible in FIGS. 2 and 3, for each end wall 22, 24, the free edge 22.1, 24.1 and the first or second end 20.1, 20.2 of the shell 20 are positioned end to end and connected by the weld line 26.

According to a second configuration, visible in FIG. 4, at least one of the end walls 22, 24 comprises:

- a central part 28 in the shape of a dome that has a free edge 28.1 positioned in a first plane P1, the center of the central part 28 being offset in a first direction with respect to the first plane P1,
- a peripheral sleeve 30, positioned around the central part 28, which extends between first and second ends 30.1, 30.2, the second end 30.2 being offset in the first direction with respect to the first end 30.1,
- a junction zone 32 connecting the free edge 28.1 of the central part 28 and the first end 30.1 of the peripheral sleeve 30.

Thus, the central part 28 and the peripheral sleeve 30 form just a single piece that has an edge face C1 positioned in the first plane P1.

In addition, the shell 20 has a counterbore 34 that has an inner lateral surface 34.1 and a bottom 34.2 distant from the first end 20.1 of the shell 20. The inner lateral surface 34.1 has a diameter substantially (i.e., 10%) equal to the diameter of the outer lateral surface F30 of the peripheral sleeve 30. The counterbore 34 has a depth P (distance separating the bottom 34.2 of the counterbore 34 and the first end 20.1 of the shell 20) substantially equal to the distance separating the first and second ends 30.1, 30.2 of the peripheral sleeve 30.

According to this second configuration, the end wall 22, 24 is positioned in the counterbore 34, the edge face C1 of the end wall 22, 24 being pressed against the bottom 34.2 of the counterbore 34, the second end 30.2 of the peripheral sleeve 30 being positioned substantially in the same plane as the first end 20.1 of the shell 20. The end wall 22, 24 and the shell 20 are connected by a weld 36, positioned between the shell 20 and the peripheral sleeve 30, which extends over the entire circumference of the shell from the second end 30.2 of the peripheral sleeve 30 and/or from the first end 20.1 of the shell 20.

The weld 36 has a length L (dimension taken parallel to the longitudinal direction) that is less than half the depth P of the counterbore 34.

Compared with the first configuration, this second solution makes it possible to simplify the assembly of the tank 18 and possible removal of the end walls 22, 24.

As illustrated in FIG. 4, as a result of the very high pressure of the fluid stored in the tank 18, the junction zone 32 tends to deform in the radial direction and to move away from the inner lateral surface 34.1 of the counterbore 34. Thus, in operation, the weld 36 is subjected to shear forces but also to bending and tensile forces as a result of the deformation of the junction zone 32. In order to avoid this deformation, the length L of the weld 36 is increased and/or the thickness (dimension taken in a transverse plane) of the peripheral sleeve 30 is increased.

These solutions are not satisfactory because they increase in the mass of the tank, make the assembly thereof more complex or even make removal and re-attachment of the end walls impossible.

SUMMARY OF THE INVENTION

The present invention aims to remedy all or some of the drawbacks of the prior art.

To this end, the invention relates to a tank comprising a shell that extends between first and second ends and at least one end wall positioned at the first end; the end wall having a central part in the shape of a dome, a peripheral sleeve positioned around the central part and a junction zone connecting the central part and the peripheral sleeve and having a first edge face; the shell having an axis of revolution and having at least first and second portions, the first portion extending between the first end of the shell and the second portion, the first and second portions respectively having first and second inner lateral surfaces, the second inner lateral surface having a diameter smaller than that of the first inner lateral surface, the shell having a second edge face connecting the first and second inner lateral surfaces; the tank having a weld connecting the first portion of the shell and the peripheral sleeve of the end wall.

According to the invention, the first and second edge faces of the end wall and of the shell have shapes configured to immobilize the junction zone with respect to the shell in a radial direction perpendicular to the axis of revolution.

Since the junction zone of the end wall no longer moves away from the first portion of the shell in operation as a result of the pressure of the fluid stored in the tank, the weld is no longer subjected to bending and tensile forces. Consequently, it is not necessary to stiffen the peripheral sleeve and/or reinforce the weld to withstand such forces.

According to another feature, at least one element among the first edge face of the end wall and the second edge face of the shell comprises or has at least one projecting shape. In addition, at least one second element, different from the first element, among the first edge face of the end wall and the second edge face of the shell comprises, for each projecting shape, or partially delimits at least one housing configured to house the projecting shape in order to immobilize the junction zone with respect to the shell in the radial direction.

According to another feature, the second edge face of the shell and the first edge face of the end wall are positioned in transverse planes perpendicular to the axis of revolution.

According to another feature, the end wall comprises a shape, projecting with respect to the first edge face, in the form of a rib that extends over the entire circumference of the first edge face. In addition, the shell has a housing in the form of a groove, which extends over the entire circumference of the second edge face, configured to house the rib. According to another feature, the groove and the rib have complementary sections.

According to another feature, the rib is situated in the continuation of the outer lateral surface of the peripheral sleeve.

According to another feature, the first and second portions are connected by a second, frustoconical edge face that flares away from the first end of the shell, the first edge face of the end wall being frustoconical and having a conicity substantially identical to that of the second edge face of the shell.

The invention also relates to a cryogenic reservoir comprising a tank according to one of the preceding features.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

Figure 1:
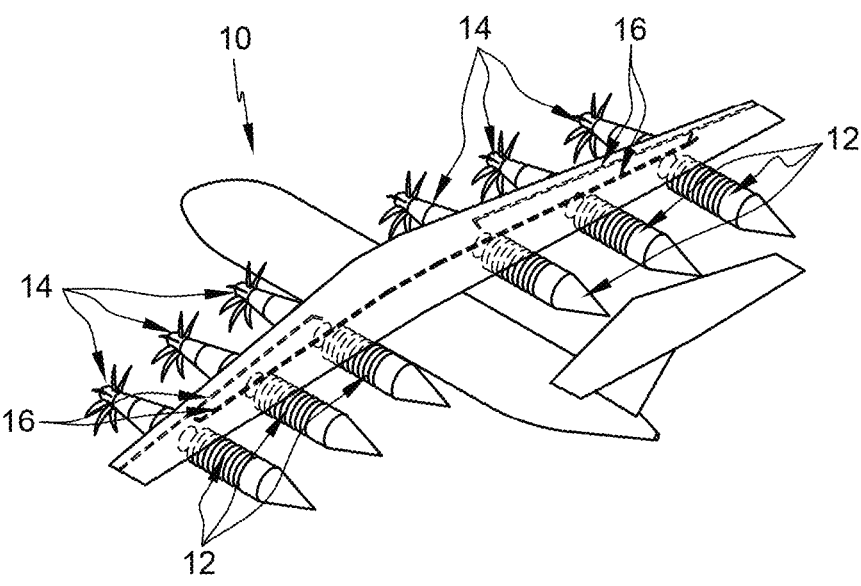
FIG. 1 is a perspective view of an aircraft.
Figure 2:
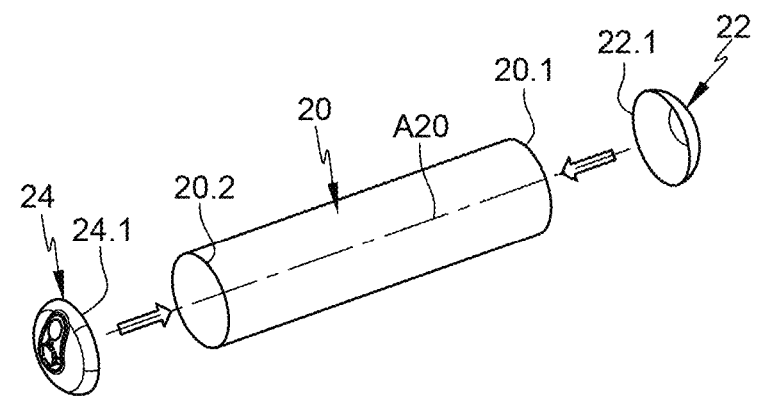
FIG. 2 is a perspective view of a tank during assembly, illustrating an assembly mode of the prior art.
Figure 3:
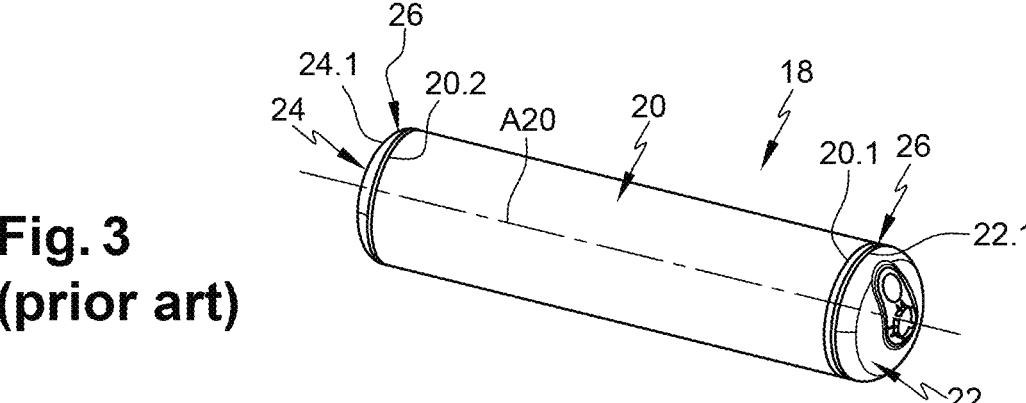
FIG. 3 is a perspective view of the tank visible in FIG. 2, at the end of assembly.
Figure 4:
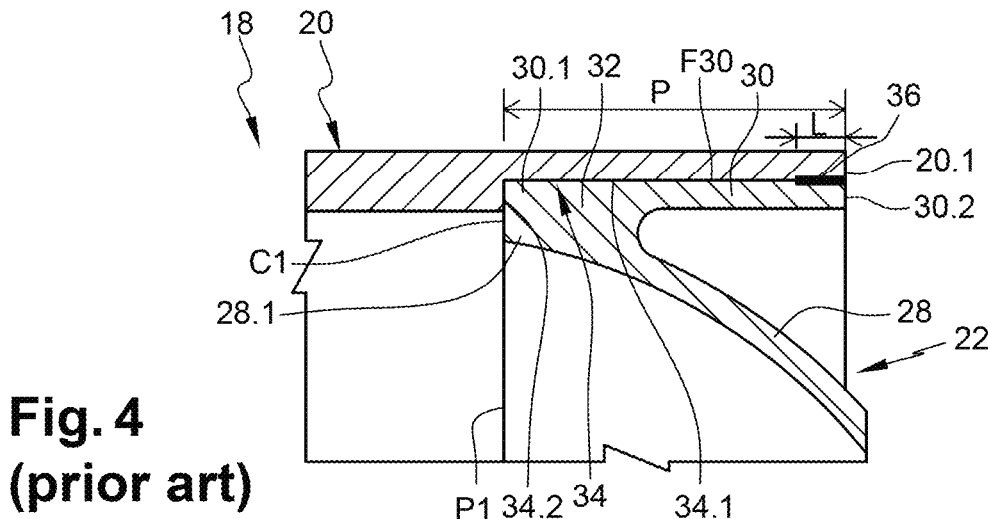
FIG. 4 is a longitudinal cross section of a part of a tank, illustrating an embodiment of the prior art.
Figure 5:
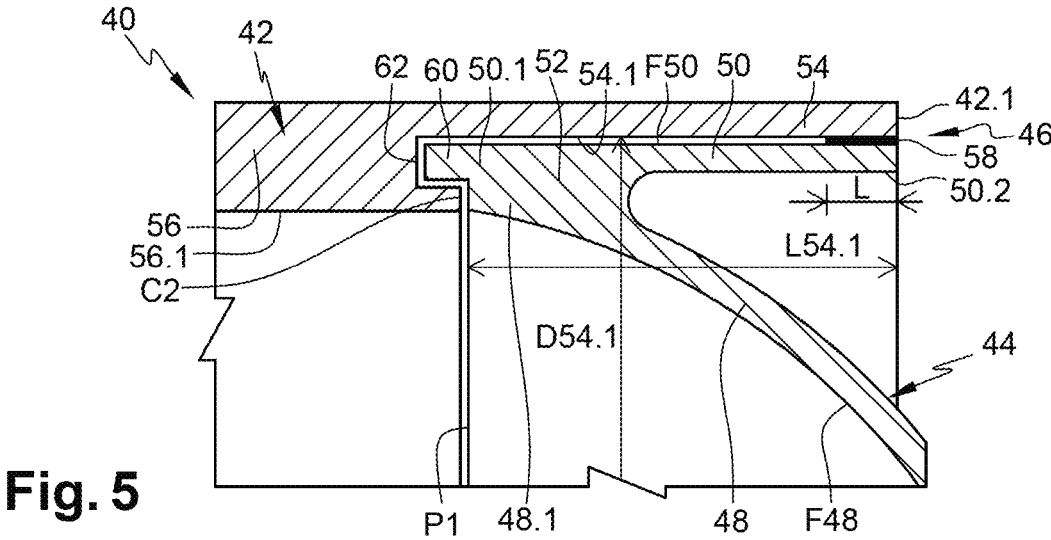
FIG. 5 is a longitudinal cross section of a part of a tank, illustrating an embodiment of the invention, and, FIG. 6 is a longitudinal cross section of a part of a tank, illustrating another embodiment of the invention.
Figure 6:
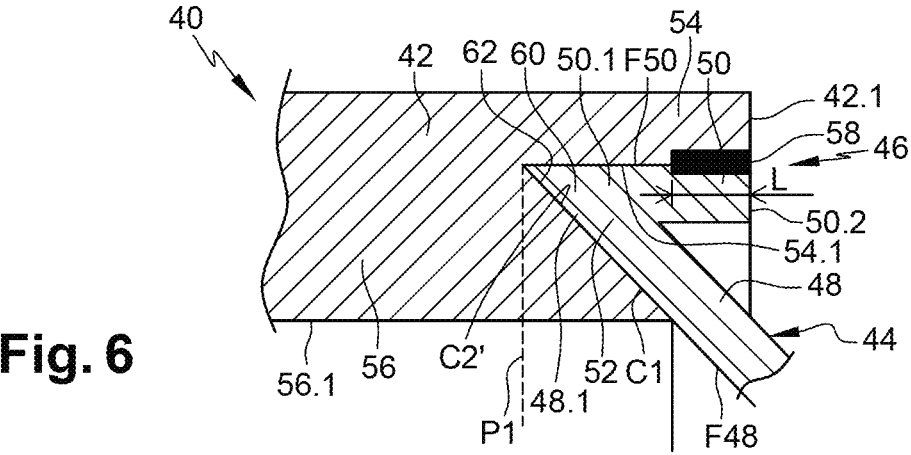

According to embodiments visible in FIGS. 5 and 6, a tank 40 comprises a shell 42 that extends between first and second ends 42.1, at least one first end wall 44 positioned at the first end 42.1 of the shell 42 so as to close it and at least one first assembly 46 connecting the first end wall 44 and the first end 42.1 of the shell 42.

For the sake of simplicity, only the first end 42.1 of the shell is shown in FIGS. 5 and 6. Similarly, only a part of the first assembly 46 connecting the first end wall 44 and the shell 42 is visible in FIGS. 5 and 6.

The tank 40 comprises a second end wall connected to the second end of the shell 42 by a second assembly. According to one configuration, the second end wall and the second assembly are respectively identical to the first end wall 44 and to the first assembly 46. As a variant, the second end wall could be different from the first end wall 44 and/or the second assembly could be different from the first assembly 46.

According to one application, the tank 40 is configured to store, in the cryogenic state and at high pressure, a fluid such as hydrogen. According to one arrangement, a cryogenic reservoir intended to store a fluid in the cryogenic state, such as hydrogen for example, and to be positioned in a vehicle, such as an aircraft for example, comprises at least one tank. According to one embodiment, the cryogenic reservoir comprises an internal tank and an external tank in which the internal tank is positioned, at least one of the tanks among the internal and external tanks conforming to the tank 40 of which a part is visible in FIGS. 5 and 6.

According to one configuration, the shell 42 is cylindrical or slightly frustoconical and has an axis of revolution. Each of the first and second ends 42.1 of the shell 42 is circular and positioned in a transverse plane.

According to the embodiments visible in FIGS. 5 and 6, the end wall 44 comprises:

a central part 48 in the shape of a dome that has a free edge 48.1 positioned in a first plane P1, the central part 48 having a center that is offset in a first direction with respect to the first plane P1, a peripheral sleeve 50, positioned around the central part 48, which extends between first and second ends 50.1, 50.2, the second end 50.2 being offset in the first direction with respect to the first end 50.1, a junction zone 52 connecting the free edge 48.1 of the central part 48 and the first end 50.1 of the peripheral sleeve 50.

Thus, the central part 48 and the peripheral sleeve 50 form just a single piece. The junction zone 52 has a first edge face C1.

The central part 48 has an inner surface F48 oriented toward the inside of the tank 40. The peripheral sleeve 50 has an outer lateral surface F50 opposite the central part 48 and oriented toward the shell 42.

The shell 42 comprises at least first and second portions 54, 56 that are coaxial with each other and with the axis of revolution of the shell 42, the first section 54 being cylindrical and extending between the first end 42.1 of the shell 42 and the second portion 56. The first portion 54 comprises a first inner lateral surface 54.1. The second portion 56 comprises a second inner lateral surface 56.1 having a diameter smaller than that of the first inner lateral surface 54.1. The first portion 54 is configured to house the peripheral sleeve 50 of the end wall 44.

According to a first configuration, visible in FIG. 5, the first and second inner lateral surfaces 54.1, 56.1 of the first and second portions 54, 56 are connected by a second, annular edge face C2 positioned in a transverse plane (perpendicular to the axis of revolution of the shell 42). According to this first configuration, the first inner lateral surface 54.1 and the second edge face C2 form a counterbore.

According to a second configuration, visible in FIG. 6, the first and second inner lateral surfaces 54.1, 56.1 of the first and second portions 54, 56 are connected by a second, frustoconical edge face C2' that flares away from the first end 42.1 of the shell 42.

The first inner lateral surface 54.1 of the first portion 54 has a diameter D54.1 and a longitudinal dimension L54.1 corresponding to a dimension taken parallel to the longitudinal direction between the first end 42.1 of the shell 42 and the second edge face C2, C2'. The diameter D54.1 of the first inner lateral surface 54.1 of the first portion 54 is substantially equal to or very slightly greater than the diameter of the outer lateral surface F50 of the peripheral sleeve 50. According to one arrangement, the longitudinal dimension L54.1 of the first inner lateral surface 54.1 of the first portion 54 is determined such that when the end wall 44 is positioned in the first portion 54 and against the second edge face C2, C2' of the shell 42, the second end 50.2 of the peripheral sleeve 50 is positioned approximately in one and the same transverse plane as the first end 42.1 of the shell 42.

The tank (more particularly the assembly 46) comprises a weld 58 positioned between the shell 42 and the end wall 44, more particularly between the first portion 54 of the shell 42 and the peripheral sleeve 50 of the end wall 44, which extends from the second end 50.2 of the peripheral sleeve 50 of the end wall 44 and/or from the first end 42.1 of the shell 42. This weld 58 has a length L that corresponds to a dimension taken parallel to the longitudinal direction. According to one configuration, the length L is less than half the longitudinal dimension L54.1 of the first inner lateral surface 54.1 of the first portion 54. This weld 58 extends continuously over the entire circumference of the shell 42. It can be produced by any suitable welding process such as a friction welding process for example.

According to one feature of the invention, the first and second edge faces C1, C2, C2' of the end wall 44 and of the shell 42 have shapes configured to immobilize the junction zone 52 with respect to the shell 42 in a radial direction. Since the junction zone 52 of the end wall 44 does not move away from the first portion 54 of the shell 42, more particularly from its first inner lateral surface 54.1, in operation as a result of the pressure of the fluid stored in the tank 40, the weld 58 is no longer subjected to bending and tensile forces. Consequently, it is not necessary to stiffen the peripheral sleeve 50 and/or reinforce the weld 58 to withstand such forces.

According to the second configuration, visible in FIG. 6, the first edge face C1 of the end wall 44 has a projecting shape 60 and the second edge face C2' of the shell 42 partially delimits a housing 62 configured to house the projecting shape 60 in order to immobilize the junction zone 52 with respect to the shell 42 in the radial direction. According to one arrangement, the first edge face C1 of the end wall 44 is frustoconical and has a conicity substantially identical to that of the second edge face C2' of the shell 42. In addition, the shell 42 has a frontal groove, delimited by the first inner lateral surface 54.1 of the first portion 54 and the second edge face C2', which extends over the entire circumference of the shell 42 and houses at least a projecting part of the junction zone 52 of the end wall 44. According to one arrangement, the first edge face C1 continues, without discontinuity, the inner surface F48 of the central part 48 of the end wall 44.

According to the first configuration, visible in FIG. 5, the first and second edge faces C1, C2 of the end wall 44 and of the shell 42 are positioned in transverse planes. According to the first configuration, at least one element among the first edge face C1 of the end wall 44 and the second edge face C2 of the shell 42 comprises at least one projecting shape 60. In addition, at least one second element, different from the first element, among the first edge face C1 of the end wall 44 and the second edge face C2 of the shell 42 comprises, for each projecting shape 60, at least one housing 62 configured to house the projecting shape 60 in order to immobilize the junction zone 52 with respect to the shell 42 in the radial direction.

According to one arrangement, the end wall 44 comprises a plurality of shapes 60 projecting with respect to the first edge face C1, which are separate and distributed over the circumference of the first edge face C1. In addition, the shell 42 comprises, at the second edge face C2, a housing 62 for each projecting shape 60.

According to another arrangement, visible in FIG. 5, the end wall 44 comprises a single shape 60, projecting with respect to the first edge face C1, in the form of a rib that extends over the entire circumference of the first edge face C1. In addition, the shell 42 has a single housing 62 in the form of a groove, which extends over the entire circumference of the second edge face C2, configured to house the rib. This groove and this rib have complementary sections, such as U-shaped sections for example. Of course, the invention is not limited to this geometry for the sections of the rib and the groove. According to one configuration, the rib is situated in the continuation of the outer lateral surface F50 of the peripheral sleeve 50. In addition, the housing 62 in the form of a groove is situated in the continuation of the first inner lateral surface 54.1 of the first portion 54.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:
   a shell extending between a first end and a second end; and
   at least one end wall positioned at the first end, the at least one end wall having
      a central part in a shape of a dome,
      a peripheral sleeve positioned around the central part, and
      a junction zone connecting the central part and the peripheral sleeve and having a first edge face,
   wherein the shell comprises an axis of revolution and having, at least, a first portion and a second portion, the first portion extending between the first end of the shell and the second portion, the first and second portions, respectively, having first and second inner lateral surfaces, the second inner lateral surface having a diameter smaller than that of the first inner lateral surface,
   wherein the shell comprises a second edge face connecting the first and second inner lateral surfaces,
   wherein the tank further comprises a weld connecting the first portion of the shell and the peripheral sleeve of the at least one end wall, wherein at least one first element among the first edge face and the second edge face comprises at least one projecting shape configured to immobilize the junction zone with respect to the shell in a radial direction perpendicular to the axis of revolution.

2. The tank as claimed in claim 1, wherein at least one second element, different from the at least one first element, among the first edge face and the second edge face comprises, for the at least one projecting shape, at least one housing configured to house the at least one projecting shape in order to immobilize the junction zone with respect to the shell in the radial direction.

3. The tank as claimed in claim 2, wherein the second edge face and the first edge face are positioned in transverse planes perpendicular to the axis of revolution.

4. The tank as claimed in claim 2, wherein the at least one projecting shape is projected with respect to the first edge face, in a form of a rib that extends over an entire circumference of the first edge face, and wherein the shell has a housing comprising a groove, which extends over an entire circumference of the second edge face and configured to house the rib.

5. The tank as claimed in claim 4, wherein the groove and the rib have complementary sections.

6. The tank as claimed in claim 4, wherein the peripheral sleeve has an outer lateral surface oriented toward the first portion and wherein the rib is situated in a continuation of the outer lateral surface of the peripheral sleeve.

7. The tank as claimed in claim 1, wherein the first and second portions are connected by a frustoconical edge face that flares away from the first end, and wherein the first edge face is frustoconical and has a conicity substantially identical to that of the second edge face of the shell.

8. A cryogenic reservoir comprising:

the tank as claimed in claim 1.

*    *    *    *    *